: US005556232A

United States Patent [19]
Malmgren

[11] Patent Number: 5,556,232
[45] Date of Patent: Sep. 17, 1996

[54] NON-HAZARDOUS, NON-SEPTIC LIQUID WASTE DRYING PROCESS

[75] Inventor: Raymond J. Malmgren, New Lenox, Ill.

[73] Assignee: Land & Lakes Company, Park Ridge, Ill.

[21] Appl. No.: 472,300

[22] Filed: Jun. 7, 1995

[51] Int. Cl.$^6$ .................................. B09B 1/00; C02F 1/02
[52] U.S. Cl. ........................ 405/129; 210/771; 210/806
[58] Field of Search ..................................... 405/128, 129; 588/249; 210/603, 768, 770, 771, 806

[56] References Cited

U.S. PATENT DOCUMENTS

| | | |
|---|---|---|
| Re. 24,469 | 5/1958 | Reinert . |
| 2,471,893 | 5/1949 | Pulley . |
| 2,780,281 | 2/1957 | Reinert . |
| 3,029,948 | 4/1962 | McKay ..................................... 210/771 |
| 3,870,585 | 3/1975 | Kearns et al. . |
| 4,698,136 | 10/1987 | El-Allay .............................. 210/787 X |
| 4,818,405 | 4/1989 | Vroom et al. ............................ 310/603 |
| 5,024,770 | 6/1991 | Boyd et al. ......................... 210/770 X |
| 5,037,561 | 8/1991 | Copeland ................................. 210/769 |
| 5,215,670 | 6/1993 | Girovich ................................. 210/770 |
| 5,228,995 | 7/1993 | Stover ..................................... 210/603 |
| 5,238,580 | 8/1993 | Singhvi ............................... 408/129 X |
| 5,354,480 | 10/1994 | Robinson et al. ................... 210/768 X |
| 5,426,866 | 6/1995 | Rumocki ............................ 210/771 X |
| 5,474,686 | 12/1995 | Barr .................................... 210/768 X |

Primary Examiner—George A. Suchfield
Attorney, Agent, or Firm—Greer, Burns & Crain, Ltd.

[57] ABSTRACT

A method for recovering solid waste from a non-hazardous, non-septic liquid waste stream which includes the steps of: powering a drying gas heating mechanism, such as a furnace, using aerobically generated biogas as a power source for the liquid drying mechanism; passing at least a portion of the liquid waste stream through a mixer, such as an inline static mixer, prior to drying the at least portion of the liquid waste stream; substantially atomizing the waste stream output from the mixer; drying the atomized waste stream using a liquid drying mechanism, such as a spray dryer; and passing waste particulate, produced by the step of drying, through a particulate collector to produce solid waste particulate. Preferably, the process includes tapping the aerobically generated biogas from a landfill.

**21 Cla

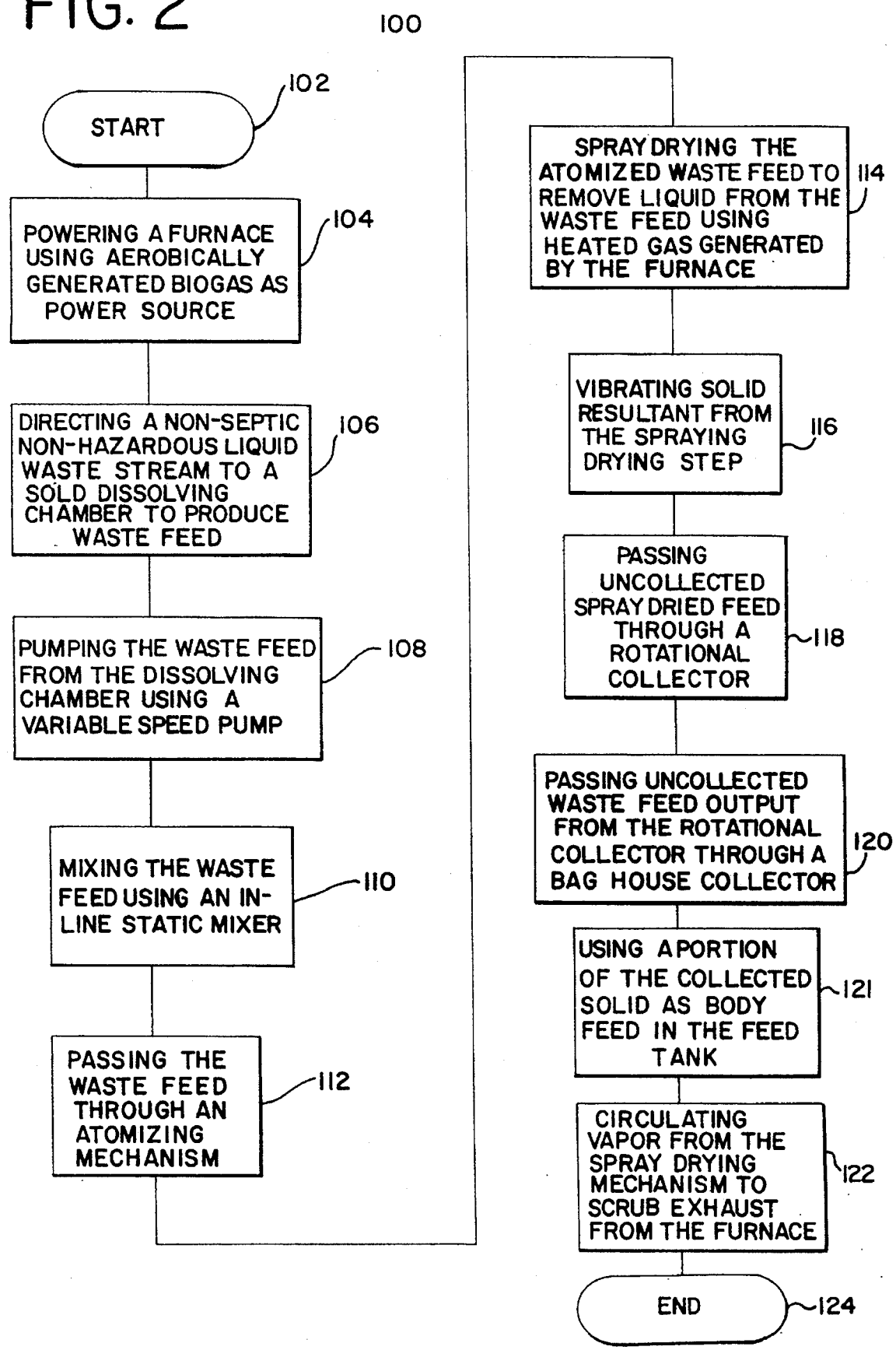

NON-HAZARDOUS, NON-SEPTIC LIQUID WASTE DRYING PROCESS

BACKGROUND OF THE INVENTION

The invention relates generally to waste treatment processes and more specifically to waste treatment processes for non-hazardous, non-septic liquid waste streams.

Septic or municipal sludge waste streams are typically dried using thermal treatment processes that include mechanically pressing the liquid out of the sludge and further drying the solid using an indirect drying process or a direct drying process. The two step process can be unnecessarily costly.

For the second part of the process, an indirect drying process may include using drum dryers or rotary dryers to remove liquid from the sludge. Sludge treatment processes also use biological digesters to digest some of the sludge. The digesters anaerobically generate biogas, such as methane, that may be used to power the indirect rotary dryer. However, where waste streams are not septic, anaerobically generated biogas may not be available. Also, the additional cost of biological digesters to produce anaerobically generated biogas can become cost prohibitive in powering the dryer.

Direct drying processes typically use hot gas that is brought into contact and mixed with the sludge in a chamber to dry the sludge directly. However, such processes may generate odorous gases that need to be subsequently treated to remove particulate matter and to maintain an odorless treatment process. Also, such processes can be costly due to the power required to generate the heated drying gas.

Non-septic, non-hazardous waste streams processes typically do not use biological digesters due to the chemical makeup of the waste stream. As a general matter, waste treatment processes for hazardous liquid waste and septic waste differ from treatment process for non-hazardous liquid waste due to the nature of the waste streams.

Non-hazardous, non-septic liquid waste streams may include kitchen grease, run-off from car washes which include detergents, i.e., soapy, resinous, low solid feeds and high solid feeds. In addition, many landfill based waste treatment facilities do not traditionally process high volumes of non-hazardous, non-septic liquid waste since most liquid waste is sent to public owned treatment works (POTW) for treatment due to the cost in treating such waste streams. Generally, the cost of the energy source necessary to evaporate significant portions of the liquid from a liquid waste stream can be cost prohibitive.

Also, conventional methods for processing non-hazardous, non-septic waste streams or concentrated waste feed, such as waste streams incorporating filler, use mechanical presses to remove some of the liquid. The resultant effluent must typically be sent to POTW's for disposal thereby adding additional cost. The solid by-product is stored in landfills. However, the amount of liquid typically remaining in the solid by-product still causes the volume of the solid by-product to be excessive. This can cause unnecessary strain on landfill sites by causing the sites to be filled earlier than necessary. Also, waste feeds containing soapy content may foam excessively during such a process thereby requiring additional chemical treatment that may unnecessarily increase cost.

Typically higher solid feeds or higher concentrated waste feeds are more economical to process since less liquid removal is required. However, as the feed becomes more concentrated, processing can be more difficult since the concentrated waste feed may more easily clog feed lines, mechanical presses and other equipment.

SUMMARY OF THE INVENTION

It is an object of the present invention to provide an improved low cost liquid waste drying process for nonhazardous, non-septic waste streams that does not require an extra initial step of dewatering a waste stream.

It is another object of the invention to provide an improved liquid waste drying process for nonhazardous, non-septic waste streams using a direct dry spray drying process to remove additional liquid from the waste stream to help reduce loading on landfills.

It is also an object of the invention to provide an improved liquid waste drying process for nonhazardous, non-septic waste streams using a spray drying process that typically allows resulting liquid to be dissipated to the atmosphere to lower waste processing costs.

It is an object of the invention to provide an improved liquid waste drying process for nonhazardous, non-septic waste streams using a spray drying process to remove liquid from the waste stream wherein the spray drying gas is generated by a furnace powered by aerobically generated biogas, such as that from a landfill, to avoid the cost in producing anaerobically generated biogas.

A further object of the invention is to provide an improved liquid waste drying process for nonhazardous, non-septic waste streams using a spray drying process to remove liquid from the waste stream that suitably processes a variety of waste streams including soapy waste streams.

It is another object of the invention to provide an improved liquid waste drying process for nonhazardous, non-septic waste streams using a direct dry spray drying process to remove additional liquid from the waste stream having mixing mechanisms and an atomizing device to facilitate processing of concentrated waste feeds.

In accordance with these objects, one embodiment of a method is disclosed for recovering solid waste from a non-hazardous, non-septic liquid waste stream, without first dewatering the waste stream, which includes the steps of: powering a drying gas heating mechanism, such as a multi-fuel furnace, using aerobically generated biogas as a power source; passing the liquid waste stream through a mixer, such as a static in-line mixer, prior to drying the liquid waste stream; substantially atomizing the waste stream output from the mixer; drying the atomized waste stream using a liquid drying mechanism, such as a heated air spray dryer or sonically activated drying mechanism; and passing waste particulate, produced by the step of drying, through a particulate collector to produce collected solid waste particulate.

In another embodiment, the process includes circulating vapor produced by the step of drying, to scrub exhaust output from the furnace. Other embodiments include using additional secondary solid collection devices such as cyclone collectors or pulsed air-bag collectors to remove additional solids in the process. Also a step of agitating the waste stream prior to the step of passing the waste stream through the mixer can be used. The process may also include the step of screening the waste stream prior to the step of agitating and may also include the step of passing the waste stream through a second mixing pump prior to the step of atomizing. If desired, the process may include using a portion of the collected solid particulate as body feed for a waste stream other than that used to produce the body feed. Where the body feed is produced from a waste stream that includes latex, the body feed is added in the feed tank and is mixed with another non-latex waste stream that includes emulsion having water based non-latex synthetic polymers and copolymer emulsion.

BRIEF DESCRIPTION OF THE DRAWINGS

FIG. 2 is a flow chart generally illustrating one embodiment of the improved liquid waste drying process for nonhazardous, non-septic waste streams using a direct dry spray drying process in accordance with the invention.

DETAILED DESCRIPTION OF THE PREFERRED EMBODIMENT

Figure 1:
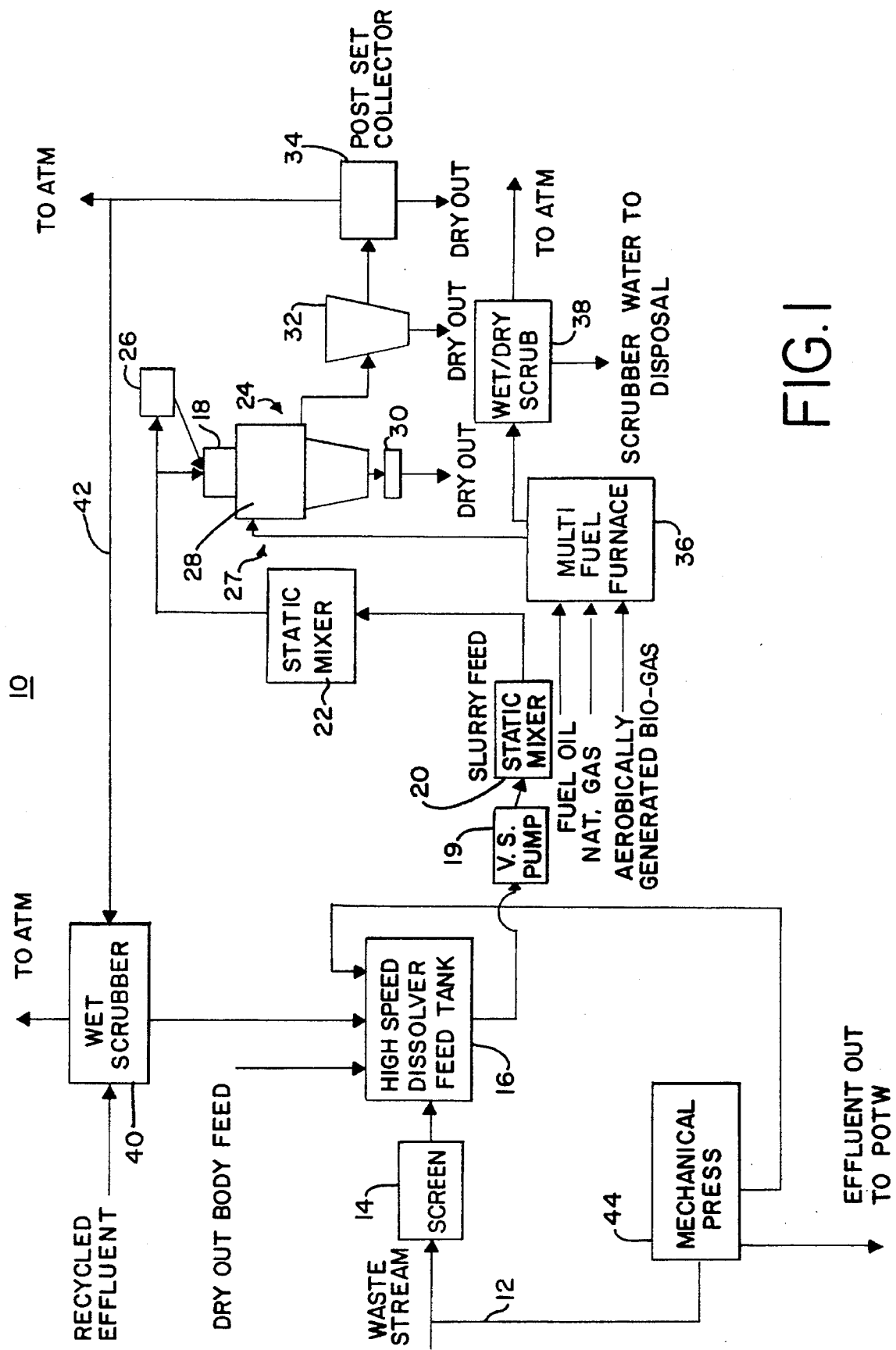
FIG. 1 is a schematic diagram generally depicting one embodiment of a system that provides an improved liquid waste drying process for nonhazardous, non-septic waste streams using a direct dry spray drying process in accordance with the invention.

Generally, the inventive waste recovery spray drying process takes liquid waste streams that are non-hazardous and non-septic and processes the waste through a spray drying mechanism to remove liquid from the waste streams and produce a solid waste. Typically, no initial dewatering step is required. The solid waste is non-hazardous and non-toxic and may be used as a fertilizer or may be disposed of in a non-toxic landfill.

More specifically, the preferred process includes obtaining aerobically produced biogas generated from a source, such as a landfill, as the main power source for a multiple fuel furnace that provides heated drying air to a spray dryer that performs the spray drying process. The aerobically produced biogas is preferably mixed with natural gas to provide a low cost energy source for the multiple fuel furnace. This allows a significant reduction in power costs compared with conventional liquid drying processes. It will be recognized that other heated air mechanisms may use biogas to power other energy sources such as boilers, electric generators or other suitable mechanisms.

Referring to FIG. 1, a solid recovery system 10 for a liquid waste stream 12 is shown. The liquid waste stream 12 is preferably a non-hazardous, non-septic concentrated waste stream. For example, the waste stream may include kitchen grease, soapy, resinous, low solid feeds and high solid feeds or a combination thereof. The waste stream 12 is preferably pretreated with chemicals, such as a variety of polymers, prior to processing. If necessary, a body feed, such as absorbent foundry clay, lime or collected solid from the system 10, may be added to the waste stream to form a suitable concentrated feed. The waste stream must be pumpable; non-pumpable waste may be processed using a stabilization process or may be considered for processing by dilution with other waste streams.

Prior to processing, the waste stream 12 may be directed over a vibrating pour screen 14 to remove large debris which could cause system damage, such as rocks, cloths and other debris. Once the large debris is removed, the waste stream 12 continues on to a high speed dissolver that serves as a spray dryer feed tank 16. Such a feed tank may be a high speed Morehouse-Cowles type dissolver such as that manufactured by Morehouse-Cowles in Fullerton, Calif. to facilitate re-slurrying of the waste stream. If desired, other suitable dissolvers or agitators may also be used. The re-slurrying effect of the feed tank 16 provides a smooth feed for eventual distribution to a spray dryer atomization device 18.

An electronically controlled variable speed, positive displacement feed pump 19, such as a progressive cavity feed pump manufactured by a Robbins and Meyers, Inc., Moyno Industrial Products Div., Springfield, Ohio, pumps the re-slurried waste feed from the high speed dissolver 12 through the feed line to an in-line slurry feed static mixer 20. The slurry feed static mixer 20 provides additional agitation of the feed and is preferably a horizontal static mixer such as a motionless mixer manufactured by Koch Engineering, Tulsa, Okla. After being agitated by the horizontal static mixer 20, the feed is passed through an in-line vertical static mixer 22 of the same type as mixer 20 to provide further agitation to provide adequate turbulent flow of the waste stream prior to being passed through the spray drying atomizing device 18. It will be recognized that the vertical static mixer 22 may not be necessary depending upon the length of the line and location of the atomizing device 18.

The system 10 uses the atomizing device 18 for atomizing the waste stream into small particulate prior to being spray dried by a spray dryer, generally designated 24. The atomizing device 18 is preferably a disk type atomizer, but a nozzle type atomizer may also be suitable for various types of waste feeds. Optionally, when the waste stream is too solid and unsuitable for atomizing, a pipe line mixer 26 or mill, such as that manufactured by GreerCo. Corp., Hudson, N.H., may be used in close proximity to the atomizing device 18 to provide a mechanism for inline continuous mixing to break down agglomerates formed during feeding.

The spray dryer 24 is a multi-collection, multi discharge device and preferably includes the atomizer 18, a heated gas inlet 27, a conical main solid collector 28 with a base discharge and a vibrating screen 30 or fixed electric or pneumatic vibrator, to reduce buildup of heavy discharged solids. A secondary particle collector 32, such as a cyclone collector, provides further solid collection and if desired, a post-secondary collector 34, such as a pulsed-air bag house collector collects fine particulate not collected by the secondary particulate collector 32. Therefore, small particulate collection is performed from multiple collection and discharge points using a cyclone-type secondary collector and a post secondary collection mechanism such as a pulsed air bag house to insure small particulate collection. The various dust collection devices allow the process to handle variations in feeds which have variations in particle size. The spray dryer 24 is a pull through spray drying unit such as that manufactured by Niro Atomizer located in Columbia, Md.

A multiple fuel fired furnace 36 produces the heated drying gas, such as heated air, supplied through the inlet 27 for the spray drying process. The furnace 36 is powered by aerobically generated bio-gas that may be mixed with natural gas, fuel oil or other suitable combustible product. The bio-gas is preferably generated aerobically by a landfill so that the production of the gas is relatively inexpensive and does not require the use of biological digesters. Also, the use of aerobically generated bio-gas from a landfill allows landfills to more economically compete with POTW's for liquid waste treatment. The bio-gas may be tapped from the landfill in a commonly known manner.

Exhaust from the furnace 36 may include unacceptable emissions that should be cleaned. To facilitate this cleaning, the exhaust is passed through a dry Scrubber 38, such as a catalytic type scrubber. The cleaned exhaust may then be vented to the atmosphere. If desired, a wet scrubber may also be used. The wet scrubber injects condensed water vapor from the dryer exhaust to scrub the exhaust from the furnace. Any resultant scrubber water would then be sent to disposal.

Referring back to the spray dryer 24, the heated drying air from the furnace 36 is sprayed onto the atomized waste stream to dry the liquid in the atomized waste. The heated drying air is circulated in the drying cone 28 and dried particulate is cyclonically collected for discharge out the bottom of the cone. Crystalline particulate may be formed depending upon the type of waste stream used.

The collector cone 28 also has a side discharge to allow lighter particulate that has not been collected and discharged by the drying cone 28 to be directed to the secondary collector 32. The secondary collector 32 also includes a bottom discharge for particulate that is cyclonically collected by the secondary collector 32 and includes a side discharge for particulate that does not get discharged out the bottom. The uncollected particulate is diverted to the post secondary bag house collector 34 for additional collection. The post-secondary collector 34 is a bag house type collector which uses a pulsed air flow to force small particulate from filters as generally known by those skilled in the art. The post secondary collector 34 also has a bottom discharge to release collected solid particulate.

A fan (not shown) in the bag house collector draws the heated drying air through each of the collectors 28, 32 and 34. Vapor produced by the heated drying air and liquid waste stream is dispersed to the atmosphere for evaporation from the bag house collector 34. Therefore little if any liquid need be diverted to a POTW as with many conventional processes. Remaining particulate, if any, may be discharged to the atmosphere.

When further particulate collection is desired after post-secondary collection, a suitable portion of the output may be recycled as shown by line 42 through a wet scrubber 40. The resulting wet particulate may be sent back to the spray dryer feed tank 16. It will be recognized by those having ordinary skill in the art, that any waste output from any of the collection processes may be recycled for further solid removal. The type of waste stream and proficiency of the collectors 28, 32 and 34 will likely determine whether recycling would be desirable. The dry waste resultant from the numerous collectors may be dìsposed by landfilling or may be used in a land application for fertilizer or re-recycled to the feed tank 16 as body feed for another waste stream as described below.

Also as shown, to improve known solid recovery processes the waste stream 12 may initially be filtered through a filtration device 44 to produce filter cake that may be sent to the high speed dissolver spray drying tank 16. The filtration device may be a conventional mechanical centrifuge, filter press or belt filter that squeezes liquid out of the waste stream.

Also, the system 10 accommodates use of recycled effluent from other waste treatment processes. The recycled effluent is passed through the wet scrubber 40 to the spray dryer feed tank 16.

Alternatively, it will be recognized that other drying processes may also be suitable, such as processes using sonic drying processes to remove liquid from waste streams. In another alternate embodiment, the water vapor resultant from the spray drying process can be recirculated and added to the waste stream to further remove any remaining particulate from the vapor output.

Referring to FIG. 2, a method 100 for recovering solid waste from a non-hazardous, non-septic liquid waste stream performed by the system of FIG. 1 is shown in flow diagram form. The method begins at step 102 by generating or obtaining a concentrated non-hazardous, non-septic waste feed and pretreating the waste stream through chemical treatment as known in the art. Next, at step 104, the method includes powering the furnace 36 that supplies heated drying gas to the spray dryer 24 using aerobically generated biogas as a power source for the furnace. In step 106, the process includes directing the waste stream 12 to the high speed dissolver (chamber) to produce waste feed suitable for delivery to the spray dryer 24.

Next, the variable speed pump 19 pumps the waste feed from the dissolving chamber 12 in step 108. The pumped waste feed is passed through the inline static mixer 20 and mixed prior to spray drying the liquid waste stream as shown is step 110. Alternatively, a thin film evaporator may be used to concentrate the waste feed. The mixed waste feed is then passed through the atomizing mechanism 18 and atomized as shown in step 112. In step 114, the atomized waste is spray dried by the spray dryer 24 using heated air produced by the aerobic biogas powered furnace as described above to remove liquid from the atomized waste stream.

In step 116, the solid waste discharged from the spray dryer cone 28 is vibrated using the vibrating screen 30 to prevent build up of solid. Uncollected particulate discharged out the side discharge of the cone 28 is passed through the rotational cyclone type secondary collector 32 as shown in step 118. Next, in step 120, uncollected particulate in the form of gaseous matter from the rotational secondary collector 32 is discharged and passed through the post secondary bag house collector 34.

Alternatively, a step 121 of using a portion of the collected solid particulate as body feed for a waste stream other than that used to produce the body feed can be performed. For example, it has been found that collected solid particulate obtained from a latex based waste feed using the spray drying method 100, serves as suitable body feed for other water based non-latex waste streams that include synthetic polymer emulsion. The non-latex emulsion includes acrylic co-polymers, polystyrene, polyolefin, polyethylene or combinations thereof. Using collected waste solid and reusing it as body feed for a waste stream reduces processing costs since additional body feed need not be purchased.

If desired, the process may include circulating vapor exhausted from the spray dryer to scrub exhaust from the furnace, as shown in step 122. The process may end as in step 124 or continuously process waste streams. It will be recognized that the order of the method 100 steps can be in any suitable order and that the inventive process need not require all of the above steps.

An advantage of the process is the elimination of an initial dewatering step, although some body feeds may be added. The spray drying process more economically removes additional liquid from the waste stream using a single liquid removal process compared to conventional two step processes to help reduce loading on landfills. In addition, the dissipation of liquid into the atmosphere helps lower waste processing costs.

Also, since the spray drying gas is generated by a furnace powered by aerobically generated biogas, such as that from a landfill, the cost in producing anaerobically generated biogas is avoided. The use of an atomizing device, variation in mixing devices and the multi-collection, multi-discharge spray drying process allows for a variety of waste streams including concentrated feeds and soapy waste streams to be processed.

It should be understood that the implementation of other variations and modifications of the invention in its various aspects will be apparent to those of ordinary skill in the art, and that the invention is not limited by the specific embodiments described herein. It is therefore contemplated to cover by the present invention, any and all modifications, variations, or equivalents that fall within the true spirit and scope of the basic underlying principles disclosed and claimed herein.

What is claimed is:

1. A method for recovering solid waste from a non-hazardous, non-septic liquid waste stream, comprising the steps of:
   (a) powering a drying gas heating mechanism using aerobically generated biogas as a power source;
   (b) passing at least a portion of the liquid waste stream through a mixer prior to drying the at least portion of the liquid waste stream;
   (c) substantially atomizing the waste stream output from the mixer;
   (d) drying the atomized waste stream using the heated drying gas; and
   (e) passing waste particulate, produced by the step of drying, through a particulate collector to produce collected solid particulate.

2. The method of claim 1 wherein the step of powering the spray drying mechanism includes the step of tapping aerobic generated biogas from a landfill.

3. The method of claim 1 wherein the step of drying includes drying the at least portion of the waste stream using a spray drying mechanism.

4. The method of claim 1 wherein the step of atomizing includes passing the portion of the waste stream through a nozzle type atomizer.

5. The method of claim 1 wherein the step of atomizing includes passing the portion of the waste stream through a disc type atomizer.

6. The method of claim 1 wherein the step of passing at least a portion of the liquid waste stream through a mixer prior to drying includes passing the portion of the waste stream through an in-line static mixer.

7. The method of claim 1 further including the step of using a portion of the collected solid particulate as body feed to the waste stream prior to atomizing the waste stream.

8. A method for recovering solid waste from a non-hazardous, non-septic liquid waste stream, comprising the steps of:
   a. powering a furnace that supplies heated drying gas to a spray drying mechanism using aerobically generated biogas as a power source for the furnace;
   b. passing at least a portion of the liquid waste stream through a mixer prior to spray drying the at least portion of the liquid waste stream;
   c. substantially atomizing the portion of the waste stream after it has been mixed;
   d. spray drying the atomized waste, using the spray drying mechanism;
   e. passing waste particulate, produced by the step of spray drying, through a particulate collector to produce collected solid particulate; and
   f. circulating water vapor produced by the step of spray drying, to scrub exhaust output by the furnace.

9. The method of claim 8 wherein the step of powering the spray drying mechanism includes the step of tapping aerobic generated biogas from a landfill.

10. The method of claim 8 including a step of mixing solid waste material in the waste stream, prior to the step of atomizing, using a second mixer.

11. The method of claim 8 wherein the particulate collector is a cyclone collector.

12. The method of claim 8 wherein the step of atomizing includes passing the portion of the waste stream through a nozzle type atomizer.

13. The method of claim 8 wherein the step of atomizing includes passing the portion of the waste stream through a disc type atomizer.

14. The method of claim 8 wherein the step of passing at least a portion of the liquid waste stream through a mixer prior to drying includes passing the portion of the waste stream through an in-line static mixer.

15. A method for recovering solid waste from a non-hazardous, non-septic liquid waste stream, comprising the steps of:
   a. powering a furnace that supplies heated drying gas to a spray drying mechanism using aerobically generated biogas from a landfill as a power source for the furnace;
   b. passing at least a portion of the liquid waste stream through a mixer prior to spray drying the at least portion of the liquid waste stream;
   c. substantially atomizing the portion of the waste stream after it has been mixed;
   d. spray drying the atomized waste, using the spray drying mechanism; and
   e. passing waste particulate, produced by the step of spray drying, through a particulate collector to produce collected solid particulate.

16. The method of claim 15 further including the step of agitating the at least portion of the waste stream prior to the step of passing the waste stream through the mixer, and also including the step of screening the portion of the waste stream prior to the step of agitating.

17. The method of claim 16 further including the step of passing the portion of the waste stream through a second mixer prior to the step of atomizing.

18. The method of claim 15 further including the step of using a portion of the collected solid particulate as body feed for a waste stream other than that used to produce the collected solid particulate.

19. The method of claim 15 wherein the step of spray drying the atomized waste includes the step of circulating the heated drying gas in a cone shaped chamber having a solid discharge.

20. The method of claim 18 wherein the body feed is produced from a waste stream that includes latex and the other waste stream with the solid particulate includes emulsion having water based non-latex synthetic polymers and copolymer emulsion.

21. A method for recovering solid waste from a non-hazardous, non-septic liquid waste stream, comprising the steps of:
   (a) passing at least a portion of the liquid waste stream through a mixer prior to drying the at least portion of the liquid waste stream;
   (b) substantially atomizing the waste stream output from the mixer;
   (c) drying the atomized waste stream using a heated drying gas; and
   (d) passing waste particulate, produced by the step of drying, through a particulate collector to produce collected solid particulate.

* * * * *